Oct. 1, 1929.        A. KESSLER        1,730,217
POT CLEANER
Filed Nov. 11, 1927

Inventor:
Albert Kessler

Patented Oct. 1, 1929

1,730,217

UNITED STATES PATENT OFFICE

ALBERT KESSLER, OF MITTWEIDA, GERMANY

POT CLEANER

Application filed November 11, 1927, Serial No. 232,613, and in Germany October 1, 1927.

My invention relates to scouring implements, for instance pot-cleaners, consisting substantially of a solid or annular body of metal fibres, such as waste of tinned or galvanized iron, copper, brass and the like, such as are used for cleaning domestic and kitchen utensils. It is an object of my invention to provide means for facilitating the handling of such bodies.

To this end I secure a handle to the body and, in a preferred embodiment of my invention, I combine with its annular portion a handle which is partly annular and is inserted in the body.

Pot-cleaners or mops of this kind are convenient and have been generally adopted, but involve the drawback that they require direct handling which is particularly troublesome when the hands get in contact with hot water in which case the skin is more affected than in the usual mops or wiping cloths of textile fibres, as the metal fibres are good heat conductors.

These drawbacks are overcome according to my invention by equipping a metal body of the kind described with a handle which may be of wire. The inner end of the handle is annular and is inserted in the body which may be a convex and substantially spherical part, an annulus, or a base combined from a spherical body and an annular bead surrounding the base. The handle which is preferably formed integral with its annular portion, projects from the body and facilitates its handling so that soiling or scalding of the hands is eliminated.

Another advantage of my appliance is that it is more efficient because a greater percentage of its surface is available for action as compared with the usual mop the abrasive surface of which is partly covered by the fingers holding it, whereas in my appliance the body is exposed throughout its surface and affords free access to the water or other liquid with which is cooperates.

Another advantage is that the base is strengthened by the bead so that it is possible to exert a very considerable pressure on the objects to be cleaned.

In the drawings affixed to this specification and forming part thereof, an implement embodying my invention is illustrated by way of example.

Figure 1:
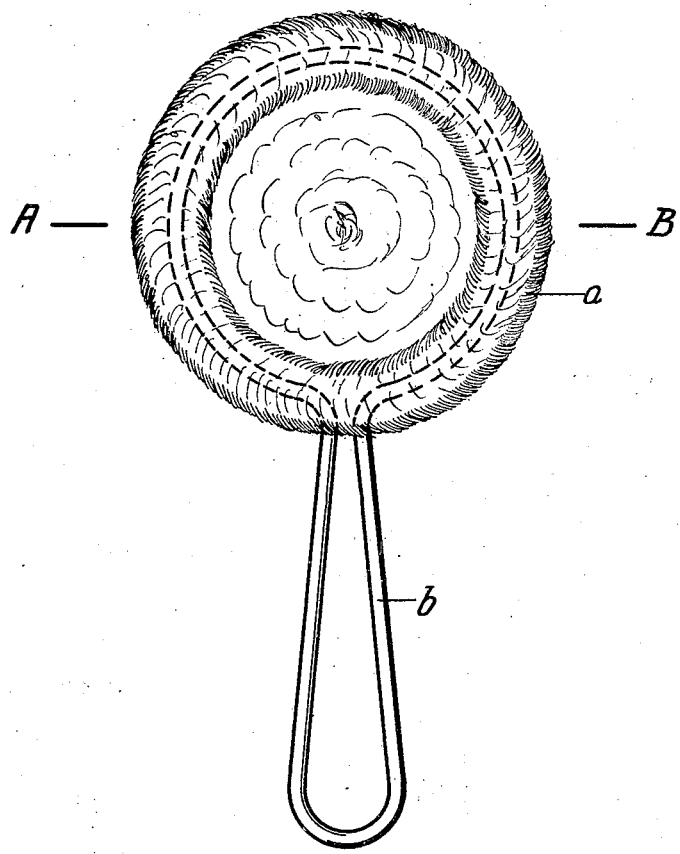
Fig. 1 is an elevation of the implement.
Figure 2:
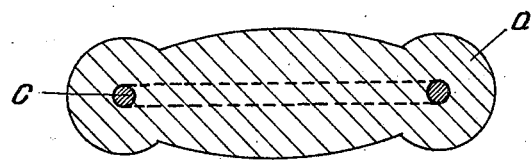
Fig. 2 is a section on the line A—B in Fig. 1.

The cleaner comprises a body $a$ which as illustrated, is combined from a convex or substantially spherical central base and an annular bead surrounding this portion. $c$ is a ring at the end of the handle projecting into the body $a$, and $b$ is a loop formed on the ring and constituting the handle proper.

I wish it to be understood that I do not desire to be limited to the exact details of construction shown and described for obvious modifications will occur to a person skilled in the art.

I claim:—

A scouring implement comprising a body of metal fibres of annular shape and including a beaded periphery, and a handle bent from a single piece of wire, said handle comprising an annulus inserted in, and a loop projecting from, said body.

In testimony whereof I affix my signature.

ALBERT KESSLER.